United States Patent Office 3,650,985
Patented Mar. 21, 1972

3,650,985
ETHYNYLATION CATALYST, CATALYST
PREPARATION, AND PROCESS
Jack R. Kirchner, Wilmington, Del., assignor to E. I. du
Pont de Nemours and Company, Wilmington, Del.
No Drawing. Original application Oct. 23, 1967, Ser. No.
677,020, now Patent No. 3,560,576, dated Feb. 2,
1971. Divided and this application Mar. 4, 1970, Ser.
No. 16,579
Int. Cl. C07c 33/04
U.S. Cl. 252—431
23 Claims

ABSTRACT OF THE DISCLOSURE

Particulate catalysts, consisting essentially of cuprous acetylide complexes containing at least 1.75 carbon atoms per copper atom, and having a total surface area of at least 5.0 square meters per gram, are prepared at 50–120° C. by the simultaneous action of formaldehyde and acetylene at a partial pressure of less than 2.0 atmospheres on cupric compounds slurried in substantially neutral aqueous media and used to catalyze ethynylation in a continuous stirred reaction at 60–120° C. and acetylene partial pressures below 2.0 atmospheres.

CROSS-REFERENCE TO RELATED APPLICATION

This is a division of application Ser. No. 677,020, filed Oct. 23, 1967, now Patent No. 3,560,576.

BACKGROUND

Copper acetylide complexes have hitherto been prepared in various ways and used to catalyze ethynylations, typically the reaction of formaldehyde with acetylene to produce butynediol, cf. Hanford et al. Ind. and Eng. Chem. v. 40, No. 7, pp. 1171–1177 (1948); Reppe "Acetylene Chemistry" PB Report 18852–8, Meyer translation, pp. 77–92 (1949); Reppe, Chemie-Ingenieur-Technik, v. 22, No. 23/24 pp. 527–539 (1950); Reppe et al. Annalen 596 pp. 6–10 (1955); U.S. Patents 2,232,867; 2,300,969; 2,487,007; 2,712,560; 2,768,215; 2,840,618; 2,871,273; 2,939,844 and 3,154,589 and British specification 698,019.

Because these prior art complexes per se have been readily explosive, difficult to filter, and active in catalyzing cuprene formation, they have typically been prepared and used together with siliceous or carbonaceous supports to facilitate handling and together with a bismuth compound to minimize cuprene formation. Commonly, the siliceous supports have been impregnated with a solution of bismuth and copper nitrates, dried, calcined to produce the metal oxides, and the copper oxide converted to an acetylide in situ in the ethynylation reactor.

In order to achieve lowest ethynylation operating costs, it has generally been preferred to use these supported catalysts in pilled form in a fixed-bed plug flow process, feeding dilute aqueous formaldehyde and employing multipoint injection of acetylene at relatively high pressure, so as to use up excess formaldehyde and minimize the extent of distillation required to produce product of the requisite purity. An undesirable feature of this approach, however, has been the high initial cost of reactors designed to withstand not only the normal operating acetylene pressures of 2 to 6 atmospheres, but also the higher pressures of up to 20 times greater than normal which occur coincidentally with the occasional development of hot spots in such fixed bed systems.

It has also been proposed to employ such supported catalysts as slurries in continuous stirred reactions. Hitherto in such systems, however, not only has it been found necessary to remove and purify the catalyst at frequent intervals to avoid fouling, but also, even with continuous complete catalysts removal, purification and recycle, it has been necessary to operate at relatively low formaldehyde conversions and relatively high acetylene partial pressures to achieve even marginally acceptable space/yields. Such processes have, therefore, involved higher operating costs than fixed-bed plug flow processes, because of higher product separation expense, and offered little in the way of initial equipment savings, because of the relatively high operating pressures required.

SUMMARY OF THE INVENTION

In accordance with the present invention, there are provided particulate ethynylation catalysts, consisting essentially of cuprous acetylide complex containing at least 1.75 carbon atoms per copper atom, and having a total surface area of at least 5.0 square meters per gram.

There are further provided processes which comprise subjecting a particulate cupric compound, as a slurry in a substantially neutral aqueous medium at 50 to 120° C., to the simultaneous action of formaldehyde and acetylene at a partial pressure of less than 2.0 atmospheres until the above-described catalysts are obtained.

There are further provided processes which comprise contacting carbonyl compound and acetylenically unsaturated hydrocarbon at a partial pressure of less than 2.0 atmospheres with the above-described catalyst as a slurry in an aqueous medium in a continuous stirred reaction at 60–120° C.

DETAILED DESCRIPTION

The catalysts of the invention essentially contain, and may consist entirely of, the particular class of copper acetylide complexes hereinafter described. While the catalysts may also contain other materials, e.g., supports such as carbon or silica, cuprene inhibitors such as bismuth oxide, acid acceptors such as calcium carbonate, other copper acetylide complexes, unconverted catalyst precursors of residues therefrom, and the like, such extraneous material do not noticeably enhance and may detract from the filterability and activity of the catalysts of the invention, and accordingly are regarded as nonessential. In one preferred form of the invention, the catalysts consist of this particular class of copper acetylide complexes, per se.

The cuprous acetylide complexes of the invention are products resulting from the combination and/or association of the copper acetylide with intermediates involved in the catalyst preparation and/or ethynylation reactions. Repeated water washing produces products in which the carbon/copper ratio does not change on further water washing, and analyses of such products when prepared from intermediates containing radioactive carbon show radioactivity deriving from both carbonyl compound and acetylenic compound. Mild degradation of the complexes with aqueous sodium cyanide produces acetylenic hydrocarbon and oxygenated acetylenic hydrocarbon. Ordinarily, continued drying of the complexes results in a change of composition corresponding to a loss of water.

As determined by combustion analysis of these catalysts, after filtering, water washing, air drying, and final drying over anhydrous calcium sulfate for three days, and correcting for the weight of any components present other than copper acetylide complexes, the particular complexes with which the present invention is concerned contain at least 1.75 carbon atoms per copper atom. The atomic ratio of carbon to copper, so determined, is ordinarily 2.0 to 12.5 and 2.5 to 5.0 in the preferred complexes. Where such analysis also affords unequivocal results for hydrogen, the complexes of the invention generally also contain at least 0.2 hydrogen atoms per carbon atom. The C/H atomic ratio so found is ordinarily greater than 0.5 and 1.0 to 2.0 in the preferred complexes. Similarly, where oxygen is taken as the difference between 100 percent and the summation of the percentages of copper, carbon and hydrogen in the complexes thus determined, after making due allowance for any oxygen associated with other elements present, such as calcium or silicon, the complexes generally contain at least 0.1 oxygen atom per carbon atom, ordinarily less than 1 oxygen atom per carbon, and usually 0.15 to 0.5 oxygen atoms per carbon atom in the preferred complexes. Ordinarily, the complexes contain 20.0 to 66.0 and preferably 40.0 to 62.0 percent copper, based on the total weight of copper, carbon, hydrogen and oxygen found to be contained in the complex by the above procedures.

In the complexes of the invention, per se, the copper, as determined by degrading the complexes, with e.g. concentrated HCl and analyzing the resulting solution by standard quantitative analysis techniques, is substantially entirely in cuprous form, there being found only trace amounts of cupric copper, corresponding to the amounts obtained on exposing cuprous solutions to air for the short period needed for the analysis operations. In preparing the catalysts of the invention from cupric precursors, the fraction of total copper in cuprous form is taken as a measure of the amount of complexed copper. Ordinarily, the particulate catalysts of the invention contain 20.0 and 66.0 percent, and preferably 40.0 to 62.0 percent cuprous copper, based on the total weight of the particulate catalyst, after filtering, washing and drying as above described.

Comparison of the empirical values determined for copper content and atomic ratio of the several elemental components of the complexes with the calculated values for various formulas such as those set forth in Table I below shows that these complexes of the invention respond more closely to the formula $$(CuC_2)_w(CH_2O)_x(C_2H_2)_y(H_2O)_z$$

where the subscript letters are integers, $w$, $x$ and $y$ being at least 1 than to the formula $(Cu_2C_2)_a(C_2H_2)_b(H_2O)_c$ where the subscript letters are integers. In the preferred complexes $x=1$ to $2y$ and $x+2y=0.5$ to $1.5w$. Ordinarily each integer is less than 100.

TABLE I

| No. | Formula | Weight percent copper | Atomic ratios |||
|---|---|---|---|---|---|
| | | | C/Cu | C/H | C/O |
| 1 | $Cu_2C_2 \cdot H_2O$ | 75.2 | 1.0 | 1.0 | 2.0 |
| 2 | $Cu_2C_2 \cdot C_2H_2 \cdot H_2O$ | 65.1 | 2.0 | 1.0 | 4.0 |
| 3 | $Cu_2C_2 \cdot (C_2H_2)_2 \cdot H_2O$ | 57.5 | 3.0 | 1.0 | 6.0 |
| 4 | $Cu_2C_2 \cdot (C_2H_2)_3 \cdot H_2O$ | 51.4 | 4.0 | 1.0 | 8.0 |
| 5 | $Cu_2C_2 \cdot CH_2O$ | 70.1 | 1.5 | 1.5 | 3.0 |
| 6 | $Cu_2C_2 \cdot CH_2O \cdot C_2H_2$ | 61.3 | 2.5 | 1.3 | 5.0 |
| 7 | $Cu_2C_2 \cdot (CH_2O)_2 \cdot C_2H_2$ | 33.6 | 3.0 | 1.0 | 3.0 |
| 8 | $Cu_2C_2 \cdot (CH_2O)_3 \cdot C_2H_2$ | 48.3 | 4.0 | 1.0 | 2.3 |
| 9 | $(CuC_2)_4 \cdot H_2O$ | 69.0 | 2.0 | 4.0 | 8.0 |
| 10 | $(CuC_2)_4 \cdot CH_2O \cdot C_2H_2$ | 62.6 | 2.8 | 2.8 | 11.0 |
| 11 | $(CuC_2)_4 \cdot CH_2O \cdot C_2H_2 \cdot H_2O$ | 59.9 | 2.8 | 1.8 | 5.5 |
| 12 | $(CuC_2)_4 \cdot (CH_2O)_2 \cdot C_2H_2 \cdot H_2O$ | 56.0 | 3.0 | 1.5 | 4.0 |
| 13 | $(CuC_2)_4 \cdot (CH_2O)_2 \cdot (C_2H_2)_2 \cdot H_2O$ | 52.9 | 3.5 | 1.4 | 4.7 |
| 14 | $(CuC_2)_4 \cdot (CH_2O)_3 \cdot (C_2H_2)_2 \cdot H_2O$ | 49.8 | 3.8 | 1.3 | 3.8 |
| 15 | $(CuC_2)_4 \cdot (CH_2O)_4 \cdot (C_2H_2)_2 \cdot H_2O$ | 47.0 | 4.0 | 1.1 | 3.2 |
| 16 | $(CuC_2)_4 \cdot (CH_2O)_4 \cdot (C_2H_2)_3 \cdot H_2O$ | 44.9 | 4.5 | 1.1 | 3.6 |
| 17 | $(CuC_2)_4 \cdot (CH_2O)_4 \cdot (C_2H_2)_4 \cdot H_2O$ | 42.9 | 5.0 | 1.1 | 4.0 |
| 18 | $(CuC_2)_6 \cdot (CH_2O)_{20} \cdot (C_2H_2)_{10} \cdot H_2O$ | 23.3 | 11.7 | 0.9 | 3.3 |

The particulate catalysts of the invention have a total surface area of at least 5.0, ordinarily 5.0 to 75.0 and preferably at least 15.0 square meters per gram, as determined by nitrogen absorption measurement on the particles after separating and drying as for combustion analysis.

In general, it has been found, active acetylide complexes in catalysts prepared from cuprous compounds, or from cupric compounds in such a way that a substantial proportion of the cupric compound is reduced to cuprous before formation of the acetylide, tend to have carbon to copper atomic ratios of less than 1.75 as initially prepared in which condition they are in the form of small, sticky, relatively explosive particles, commonly containing appreciable amounts of metallic copper, as determined by the presence of peak pairs associated with metallic copper on X-ray diffraction analysis, and commonly cointaining more than 25 weight percent of particles having a cross-sectional dimension of less than 5.0 microns as determined by Coulter Counter analysis. Such complexes are ill adapted for use in continuous stirred reactions, because of their instability, because of their tendency to blind the filter elements through which the effluent from a heterogeneously catalyzed continuous stirred reaction is continuously removed, and because of their tendency to form cuprene in contact with acetylene. Furthermore, while the atomic ratio of carbon to copper in such catalyst complexes will appear to rise above 1.75 with continued use for ethynylation, possibly as the result of cuprene formation, at the same time the total surface area of the catalyst as determined by nitrogen absorption tends to decrease to less than 5.0 square meters per gram, with such attendant loss in catalytic activity as to provide unacceptably low space/time yields of ethynylation product at acetylene partial pressures of less than about 5 atmospheres. Similarly, it has been found, copper acetylide catalysts prepared from cupric compounds under acetylene partial pressures of greater than 2.0 atmospheres, or in the absence of formaldehyde, or in the presence of radically unbalanced amounts of acetylene of formaldehyde, or from cupric compounds which are highly soluble or dispersed in media where the copper tends to dissolve, tend to have low total surface areas which may well be below 5.0 square meters per gram. Thus, the catalysts of the present invention, in consisting essentially of copper acetylide complexes in which the atomic ratio of carbon to copper is at least 1.75, and in having at the same time a total surface area of greater than 5.0 square meters per gram, are distinguished from the ethynylation catalysts of the prior art. Coincidentally therewith, they possess a hard granular character, a stability and an ethynylation activity which renders them uniquely attractive for use in continuous stirred ethynylation at low pressure.

Ordinarily, the catalysts of the invention are further characterized as being substantially free of metallic copper, as determined by the absence of peak pairs associated with metallic copper on X-ray diffraction analysis. Small amounts of metallic copper may occasionally by present, possibly resulting either from the use of precursor containing appreciable amounts of cuprous compound or appreciable amounts of soluble cupric compound. Presence of metallic copper tends to foster cuprene formation, which, however, can be minimized by including bismuth compounds in the catalyst.

Ordinarily, the catalysts of the invention are further characterized in that at least 75 and usually at least 85 or more weight percent of the catalyst is in the form of particles having a cross-sectional dimension of at least 5, ordinarily 5 to 40 and preferably 8 to 30 microns as determined by Coulter analysis. The size of the average particle is preferably 10 to 20 microns for optimum combination of filterability and activity. In particularly preferred catalysts substantially all of the particles are larger than 3 microns in at least one cross-sectional dimension.

The particulate catalysts of the invention are prepared by a topochemical reaction occurring at the surface of particles of cupric compound slurried in an aqueous medium at the reaction temperature. The topochemical reaction continues to convert successive layers of the cupric compound as the reaction proceeds, leading ultimately to particulate complexes in which the cupric compound is completely converted to cuprous acetylide. For reasons already indicated, the topochemical reaction as well as the cupric form of the precursor appear essential to obtaining the desired results. Accordingly, although any cupric precursor of limited water solubility can be used as an intermediate, and solubility in the particular aqueous medium employed can be further minimized by controlling the pH of the aqueous medium, advantageously the cupric precursor will be substantially free of cuprous and soluble cupric compounds. Illustrative of insoluble cupric compounds are cupric oxide, cupric silicate, cupric phosphate, cupric hydroxide, basic cupric carbonate, and the like. Of these, the basic cupric carbonates are particularly preferred because of the rapidity with which active catalysts can be prepared from them, and because of the superlative filterability, purity, stability, and activity of the resulting catalysts.

A list of useful basic cupric carbonates appears in the Kirk-Othmer "Encyclopedia of Chemical Technology," first edition, volume 4, page 469. Carbonate having the empirical formula $Cu_2CH_2O_5$, usually written as $$CuCO_3 \cdot Cu(OH)_2$$

malachite, is preferred for availability. Since contamination of the insoluble cupric precursor with minor amounts of soluble cupric salts, particularly those of oxidizing acids such as sulfuric, as usually found in the naturally occurring mineral, has an adverse effect on the catalyst obtained, it is particularly preferred to use a highly pure synthetic malachite derived from the reaction of cupric nitrate and a soluble carbonate, with a calculated $CuO/CO_2$ mole ratio of 1.0 to 3.0, preferably 1.80 to 2.20, and ideally about 2.0, which assays less than 0.2 weight percent of sulfur, calculated as sulfate ion. Some control of the total surface area and particle size of the ultimate catalysts can be achieved by control of the size and distribution of particle sizes of the precursor particles. The particles tend to grow in cross-section as the conversion to acetylide proceeds. Preferably, the precursor particles will be substantially all larger than 2.0 microns in cross-sectional dimension, as determined by Coulter Counter analysis, and will have a total surface area of at least 5.0 square meters per gram as determined by nitrogen absorption.

In preparing the particulate complexes of the invention, the slurried cupric precursor is subjected to the simultaneous action of formaldehyde and acetylene at a partial pressure of not more than 2.0 atmospheres in a substantially neutral aqueous medium at 50–120° C. At temperatures substantially outside this range, or in strongly basic or acidic media, or at acetylene partial pressures greater than 2.0 atmospheres, or in the substantial absence of either formaldehyde or acetylene, catalysts of low total surface area and low ethynylation activity tend to result. Preferably, the catalyst preparation temperature is in the range of 60 to 90° C. The pH of the aqueous medium is in the range of 3.0 to 10.0, advantageously 5.0 to 8.0, and preferably 6.0 to 7.0, at the outset of the reaction. The concentration of formaldehyde in the aqueous medium is ordinarily in the range of 1.0 to 66.0, advantageously at least 5, and preferably 20 to 40 weight percent, at the outset of the reaction. Ordinarily, the amount of liquid medium will be such as to provide 5 to 20 moles of formaldehyde per gram atom of cupric copper in the precursor. Ordinarily, the partial pressure of acetylene over the aqueous medium is in the range of 0.001 to 2.0 atmospheres; advantageously it is in the range of 0.005 to 0.5, and preferably 0.01 to 0.3 atmosphere per weight part of formaldehyde present in 100 parts of the aqueous liquid medium, but less than 2.0 atmospheres.

In carrying out the catalyst preparation, nitrogen or other substantially inert gas such as methane or carbon dioxide may be present, as may also common components of crude acetylene, such as methyl acetylene and ethylene. Oxygen is preferably excluded for safety reasons. In small catalyst batches, the particulate cupric compound precursor may be slurried in cold neutral formaldehyde solution and the acetylene introduced as the slurry is heated. For larger batches, it is preferable for reasons of safety to introduce the cupric precursor incrementally to hot neutral formaldehyde solution under acetylene pressure. The aqueous solution may advantageously be a stream containing propargyl alcohol and/or butynediol, e.g. a recycle stream.

The catalyst preparation reaction is preferably continued until the copper is substantially completely converted to cuprous acetylide, which, with the preferred carbonate precursors, generally requires 1 to 4 hours after all the precursor has been contacted under the prescribed conditions, and with other precursors substantially longer. Preferably, also, the prescribed conditions of temperature, pH and acetylene/formaldehyde concentration balance and range will be maintained throughout the catalyst preparation period. However, minor departures from the prescribed conditions during the course of the preparation reaction can be tolerated, inasmuch as only a portion of the overall reaction is occurring at any given moment.

The pH of the aqueous medium normally decreases as the reaction proceeds, at a rate and to an extent which tends to increase with the initial acidity of the reaction medium and also with the reaction temperature. Accordingly, the pH may be, and advantageously is, controlled to some extent by beginning at the preferred initial pH of 6.0 to 7.0, and to some extent by operating in the preferred temperature range of 60 to 90° C. Additional control may be achieved by adding small amounts of acid acceptor such as calcium carbonate as the reaction proceeds. Further control may be achieved by carrying out the catalyst preparation as a continuous stirred reaction, fresh neutral formaldehyde solution being continuously introduced into an agitated reaction zone, and acidic effluent being filtered away from the copper containing particles as the reaction proceeds, all the while maintaining acetylene pressure.

The ethynylation process of the invention comprises contacting formaldehyde and acetylene at a partial pressure of not more than 2.0 atmospheres with an aqueous slurry of the catalyst of the invention in a continuous stirred reaction at 60–120° C. In the continuous stirred reaction, formaldehyde and acetylene are continuously fed into a reaction zone where they are introduced into, and preferably below the surface of, the aqueous catalyst slurry, and thoroughly mixed into same by mechanical stirring, gas agitation, sonic waves or other means, and effluent is continuously withdrawn through filter elements immersed in the agitated catalyst slurry.

The amount of catalyst used in the ethynylation process is not critical, but is preferably such as to provide 1 to 10 weight parts of cuprous copper per 100 weight parts of aqueous medium. The reaction temperature is desirably 60–120° C., advantageously 80–115° C., and preferably 90–100° C. Advantageously, the pH of the reaction mixture will be in the range of 3.0 to 10.0 and preferably 5 to 7, and may be maintained by ion exchange or acid acceptor treatment of the continuous feed. It is important for continued maximum ethynylation activity that a proper balance between formaldehyde and acetylene be maintained while either is in contact with the slurry at reaction temperature, and that when the reaction is stopped, the formaldehyde concentration, acetylene partial pressure and temperature all be lowered at approximately the same time, e.g., by substituting cold water for the aqueous formaldehyde feed and inert gas such as nitrogen for the acetylene feed at the same time.

The formaldehyde concentration in the liquid medium in contact with the slurried catalyst during the course of the ethynylation reaction will be ordinarily 1 to 66, advantageously at least 5, and preferably about 10 weight percent under steady state conditions. The acetylene partial pressure will ordinarily be at least 0.001 atmosphere. Advantageously, the acetylene partial pressure will be in the range of 0.005 to 0.5 atmosphere per weight part of formaldehyde present in 100 parts of said medium. Preferably, the acetylene partial pressure will be 0.01 to 0.3 atmosphere, per weight part of formaldehyde present in 100 parts of said medium, but not over 2.0 atmospheres. For the purpose of the present invention, in the substantial absence of extraneous gas, the acetylene partial pressure may be taken as the absolute pressure less the vapor pressure of water at the reaction temperature. As in catalyst preparation crude acetylene may be used, but for safety reasons is advantageously substantially free of oxygen.

The concentration of formaldehyde in the feed to the continous stirred reaction will be ordinarily at least 1 percent, advantageously at least 20 percent and preferably 40 to 66 weight percent in order to achieve maximum space/time yields of propargyl alcohol and butynediol. The rate of feeding formaldehyde will then be ordinarily such as to result in at least 50 and preferably 75 to 85 percent formaldehyde conversion across the reaction zone.

The effluent from the reactor is then heated and/or subjected to reduced pressure to volatilize formaldehyde, propargyl alcohol and a portion of the water which are condensed and combined with supplemental concentrated formaldehyde for recycle to the ethynylation reactor, purging any build-up of methanol at convenient intervals in a continuous operation, and sending the balance of the effluent as aqueous butynediol directly to hydrogenation. Alternatively, effluent from the continuous stirred reaction mya be fed to a conventional plug flow ethynylation to react any excess formaldehyde.

The invention is more specifically described and explained by means of the following illustrative and comparative examples in which, except as otherwise specified, all parts and percentages are on a weight basis, and all catalysts have a total surface area of at least 5.0 square meters per gram.

Example 1

To a glass reactor of ca. 450 parts water capacity were charged, at ambient temperature (a) 400 parts of aqueous 20–35 percent formaldehyde solution having a pH of 6.0 to 7.0 and an acid content, calculated as formic acid, of 10 or less part per million, and (b) 30 parts of particulate basic cupric carbonate, (malachite), $CuCo_3 \cdot Cu(OH)_2$, having a sulfur content, calculated as $SO_4$, of less than 0.2 percent, a copper contant and evolvable $CO_2$ content corresponding to a $CuO/CO_2$ mole ratio in the range of 1.80 to 2.20, a total surface area of at least 2 square meters per gram, the particles comprising at least 75 percent, as determined by Coulter Counter analysis, of particles having a cross-sectional dimension of at least 2 microns.

The charge was stirred, purged with acetylene, heated during about 10 minutes to 65–75° C., and then maintained with stirring for 3 to 4 hours at 65–75° C. under a total pressure of 1.0 to 1.5 atmospheres absolute, corresponding to an acetylene partial pressure of 0.6 to 1.25 atmospheres, the acetylene being continuously introduced below the surface of the liquid and gas being continuously vented through a relief valve exiting from the top of the reactor.

On the order of 1 to 5 percent of the resulting slurry was removed from the reactor, filtered, and the retained solids washed free of liquid reaction medium with distilled water. A portion was dried at ambient temperature over anhydrous calcium sulfate for 3 to 5 days. Portions of the dried sample weer analyzed (a) by combustion and standard quantitative analysis procedures to determine the copper, carbon, and hydrogen content, the balance then unaccounted for being taken as oxygen, (b) by X-ray diffraction to determine the presence or absence of peak pairs associated with metallic copper, (c) by nitrogen absorption techniques to determine total surface area; portions of the wet by Coulter Counter to determine the range of particle sizes and average particle size. The balance of the slurry particles were repeatedly washed with water and resulting aqueous slurry tested for catalytic activity in the ethynylation of formaldehyde. The activity was tested under standard conditions in a batch reaction in a stirred glass reactor of ca. 450 parts water capacity. The catalyst slurry was charged to the reactor along with aqueous formaldehyde, producing a slurry of the catalyst in 400 parts of liquid medium containing 20 to 35 percent formaldehyde at room temperature. More acetylene than needed for reaction was bubbled into the slurry, and the excess vented, generally at an exit rate in the range of 0.01 to 0.1 liter per minute, and the reactor contents then rapidly heated to 90° C. during 3 to 10 minutes. Partial pressure of acetylene at the 90° C. temperature was 0.5 atmosphere. Small samples of the reaction liquor were removed at intervals and analyzed for formaldehyde. Activity was expressed in two ways. In the first, hereafter referred to as "I," it was expressed either as the percentage of formaldehyde charged which reacted in two hours, or other time in hours specified, after commencement of heating to achieve these standard conditions. In the second, it was expressed as the rate at which the natural logarithm of formaldehyde concentration, per hour after starting heat, was decreasing under these standard conditions at the instant when 80 percent of the formaldehyde charged had reacted. Mathematically, this latter value, hereafter referred to as "J," is the slope of the tangent, at the indicated point, of the curve obtained by plotting log percent formaldehyde concentration versus hours of reaction time. In separate tests, the "J" value was found to be closely proportional to the space/time yields of butynediol obtained when using the catalyst in a continuous stirred ethynylation reaction such as described in Examples 45 to 50.

A typical set of results of such preparation, analysis and testing was as follows:

| | | Found | Calculated For $(CuC_2)_w(CH_2O)_x(C_2H_2)_y(H_2O)_z$, w/x/y/z=15/4/2/6 |
|---|---|---|---|
| A | Percent copper in catalyst | 59.8 | 59.8 |
| B | Atomic ratio C/Cu in catalyst | 2.5 | 2.5 |
| C | Atomic ratio C/H in catalyst | 1.6 | 1.6 |
| D | Atomic ratio C/O in catalyst | 3.8 | 3.8 |
| E | Copper metal by X-ray diffraction | Absent | |
| F | Catalyst surface area, $M^2$ per gram | 55 | |
| G | Weight percent of catalyst particles having a cross-sectional dimension of at least 5.0 microns | 75 | |
| H | Average particle size, microns | 11 | |
| I | Activity, percent formaldehyde reacted in two hours or hours specified under standard conditions | 90 | |
| J | Activity, rate at which natural log of formaldehyde concentration decreasing per hour of reaction time when 80 percent of formaldehyde charged reacted under standard conditions. | 1.5 | |

Example 2

The general procedure of Example 1 was repeated except that the aqueous medium used in catalyst preparation also contained 3.2 percent propargyl alcohol, with the following results, referring to the letters of Example 1.

Calculated for w/x/y/z=12/4/4/5 (percent): A, 55.9; B, 3.0; C, 1.4; D, 4.0. Found (percent): A, 55.9; B, 3.0; C, 1.4; D, 4.0; I, 92.

Example 3

The general procedure of Example 1 was repeated except that the aqueous medium used in catalyst preparation contained 0.75 percent propargyl alcohol, 38.6 percent butynediol and 9.4 percent formaldehyde, with the following results, referring to the letters of Example 1.

Calculated for $w/x/y/z=12/3/2/5$ (percent): A, 59.4; B, 2.6; C, 1.6; D, 3.9. Found (percent); A, 59.5; B, 2.6; C, 2.0; D, 3.7; I, 92.

Examples 4–9

The general procedure of Example 1 was repeated several times at the below-indicated acetylene partial pressures and initial formaldehyde concentrations, for catalyst preparation, with results as follows, referring to the letters of Example 1, and including $w/x/y/z$ values of complexes of approximately the same calculated analysis.

| Ex. | Initial percent formaldehyde | Acetylene partial pressure | A | B | C | D | I | J | w/x/y/z |
|---|---|---|---|---|---|---|---|---|---|
| 4 | 11 | 0.8 | 61.5 | 2.5 | 2.6 | 4.3 | 58 | 0.9 | 6/1/1/1 |
| 5 | 20 | 0.8 | 59.5 | 2.6 | 1.9 | 3.2 | 89 | 1.8 | 6/1/1/2 |
| 6 | 20 | 0.9 | 58.6 | 2.6 | 1.7 | 3.3 | 80 | 1.3 | 6/1/1/3 |
| 7 | 30 | 0.9 | 60.1 | 2.6 | 1.8 | 4.8 | 90 | 1.5 | 6/1/1/2 |
| 8 | 30 | 1.0 | 61.9 | 2.6 | 1.7 | 5.9 | 56 | 0.7 | 6/1/1/2 |

In Example 4, when $w=4$, the $w/x/y/z$ values are 4.0/0.67/0.67/0.67.

(9) In contrast, under these general conditions but in the absence of formaldehyde, using a precursor of 21 m.²/g. surface area, the product isolated at the end of the catalyst preparation process showed the following values:

| Example 9 | Found | Calculated for $(CuC_2)4.H_2O$ w/x/y/z $=(4/0/0/1)$ |
|---|---|---|
| A | 69.0 | 69.0 |
| B | 2.0 | 2.0 |
| C | 3.1 | 4.0 |
| D | 7.9 | 8.0 |
| F | 1.5 | |
| I | 5 | |

Examples 10–15

The general procedure of Example 1 was repeated several times at the below-indicated temperatures and acetylene partial pressures during catalyst preparation, and the acidity determined at the commencement of the preparation and at intervals of 1, 2 and 3 hours thereafter, with results as follows, referring to the letters of Example 1.

In Examples 10 and 13, when $w=4$, the $w/x/y/z$ values correspond to 4.0/0.24/0.24/1.41 and 4.0/1.20/0.80/2.80 respectively.

Examples 16–22

The general procedure of Example 1 was repeated several times but at the below-indicated initial pH values of the aqueous medium for catalyst preparation, achieved by adding sodium carbonate or formic acid to the reaction medium.

| Ex. | Initial pH | Temp. (° C.) | Acetylene partial pressure (atm.) | A | B | C | D | I | F |
|---|---|---|---|---|---|---|---|---|---|
| 16 | 9.4 | 69 | 0.85 | 61.7 | 2.4 | 1.8 | 3.0 | 68 | |
| 17 | 5.8 | 75 | 0.61 | 60.5 | 2.5 | 2.0 | 3.9 | 87 | 38 |
| 18 | 5.7 | 75 | 0.85 | 55.7 | 2.7 | 1.1 | 2.7 | 97 | |
| 19 | 4.5 | 75 | 0.61 | 59.5 | 2.6 | 1.1 | 4.3 | 71 | 31 |
| 20 | 4.5 | 75 | 0.85 | 57.3 | 2.6 | 1.7 | 3.0 | 73 | |
| 21 | 4.0 | 75 | 0.61 | 64.7 | 2.3 | 1.6 | 6.0 | 32 | 13 |
| 22* | 3.8 | 68 | 0.85 | 69.5 | 2.1 | 1.8 | 17.4 | 42 | |

*On analysis of a sample during activity testing, values for A through D approximated those of Example 21.

Examples 23–26

The general procedure of Example 1 was repeated several times using an acetylene partial pressure of 0.95 atmosphere, but adding the below-indicated amounts of sulfate ion, as $Na_2SO_4$, to the reaction medium, with results as follows, referring to the letters of Example 1, all catalysts having "F" values of greater than 5.0 and approximately proportional to the "I" values.

| SO₄ in medium, p.p.m. | A | B | C | D | I |
|---|---|---|---|---|---|
| 0 | 59.9 | 2.6 | 1.7 | 4.1 | 89 |
| 48 | 61.2 | 2.5 | 1.6 | 4.4 | 70 |
| 96 | 62.3 | 2.5 | 1.7 | 5.2 | 55 |
| 192 | 63.9 | 2.2 | 1.7 | 4.5 | 40 |

Examples 27–34

The general procedure of Example 1 was repeated using various particulate cupric compounds as precursors, each comprising at least 75 percent of particles larger than 2 microns, having a total surface area of greater than 10

| Example | Temp. (° C.) | Acetylene (atm.) | pH after— 0 hrs. | 1 hrs. | 2 hrs. | 3 hrs. | A | B | C | D | F | I |
|---|---|---|---|---|---|---|---|---|---|---|---|---|
| 10 | 50 | 1.13 | 6.1 | 6.2 | 6.5 | 6.7 | 65.4 | 2.2 | 2.1 | 5.4 | 6 | 13 |
| 11 | 57 | 1.06 | 6.0 | 6.0 | 4.3 | 4.1 | 61.8 | 2.5 | 2.0 | 4.7 | 22 | 52 |
| 12 | 65 | 0.99 | 6.0 | 5.7 | 3.8 | 3.7 | 57.7 | 2.6 | 1.6 | 3.1 | 38 | 87 |
| 13 | 75 | 0.82 | 5.7 | 4.8 | 3.4 | 3.4 | 55.6 | 2.7 | 1.1 | 2.7 | 45 | 98 |
| 14 | 90 | 0.51 | 6.2 | 3.2 | 3.3 | 3.3 | 60.5 | 2.7 | 1.3 | 6.0 | 36 | 82 |

(15) In contrast under these same general conditions but at an acetylene partial pressure of 1.2 atmosphere and 40° C. during a catalyst preparation, A=66.0, B=2.1, C=2.0, D=4.8, F=4, I=11. Calculated for $$(CuC_2)_4(H_2O)_2$$

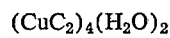

A=65.8, B=2.0, C=2.0, D=4.8. Calculated $w/x/y/z$ values for the complexes of Examples 10 to 15, respectively, were 17/1/1/6; 17/4/2/5; 16/4/3/9; 10/3/2/7; 16/5/3/3; and 100/2/3/43.

square meters per gram, and containing less than 0.2 percent sulfur calculated as sulfate. Special conditions and results are set forth below, referring to the letters of Example 1 and the following letters.

(a) Example No.
(b) Precursor
(c) Precursor wt., g.
(d) Calcium carbonate added, g.
(e) Catalyst preparation time, including, after the "/", indicated hours under activity testing conditions
(f) Notes

| a | b | c | d | e | f | A* | B | C | D | F | I |
|---|---|---|---|---|---|---|---|---|---|---|---|
| 27 | CuO | 21.1 | 0 | 26/11 | | 63.9 | 2.2 | 1.7 | 4.7 | 16 | 16 |
| 28 | CuO | 21.1 | 10 | 24/6.5 | (1) | 62.3 | 2.0 | 0.7 | 2.2 | | 31 |
| 29 | Cu₃(PO₄)₂·3H₂O | 40.9 | 15 | 16 | (2) | 61.0 | 2.9 | 1.5 | 3.8 | | 72 |
| 30 | CuSiO₄ | 39.0 | 0 | 3/7.5 | (3) | 52.5 | 2.6 | 1.5 | 0.3 | | 52 |
| 31 | Cu(OH)₂ | 26.0 | 10 | 3 | | 60.9 | 2.4 | 1.5 | 3.9 | | 72 |
| 32 | Cu(OH)₂ | 26.0 | 0 | 9/6 | | 63.2 | 2.4 | 1.8 | 5.3 | 12 | 35 |
| 33 | CuCO₃·Cu(OH)₂ | 20.8 | 0 | 3 | (4) | 61.8 | 2.5 | 2.0 | 4.8 | | 43 |
| 34 | CuCO₃·Cu(OH)₂ | 30.4 | 15 | 3 | (5) | 58.6 | 2.6 | 1.6 | 3.7 | | 88 |

1 Catalyst analyses corrected for calcium carbonate on basis of calcium analysis.
2 Catalyst analyses corrected for calcium phosphate and unreacted copper phosphate on basis of calcium and phosphorous analyses.
3 Catalyst analyses corrected for silica on the basis of silicon analysis.
4 Precursor CuO/CO₂ mole ratio 2.89.
5 Precursor CuO/CO₂ mole ratio 1.95.
* Uncorrected cuprous copper analyses exceeded 20 percent.

Examples 35–38

In contrast to the preceding set of examples, the general procedure of Example 1 was repeated using 26.1 grams of cuprous chloride precursor having a particle size range of up to 35 microns, 13.2 grams of calcium carbonate buffer, and a reaction temperature of 90° C. under a acetylene partial pressure of 0.5 atmosphere. The product was subjected to three successive cycles of activity testing, with a sample of the catalyst being removed for analysis after each cycle. Results were as follows, referring to the letters of Example 1. Analyses were corrected for calcium carbonate on the basis of calcium analysis.

| Ex. No. | Cycle | A | B | C | D | I |
|---|---|---|---|---|---|---|
| 35 | Make | 73.3 | 1.2 | 1.7 | 2.6 | 72 |
| 36 | First | 74.8 | 1.5 | 2.4 | 8.3 | 72 |
| 37 | Second | 75.3 | 1.2 | 1.3 | 3.6 | 79 |
| 38 | Third | 73.9 | 1.4 | 1.3 | 4.8 | 76 |

After the third cycle, the catalyst comprised, by Coulter Counter analysis, over 50 percent of particles smaller than 5 microns. The particles were contaminated with metallic copper, were relatively soft and sticky, and were unsuitable for use in a continuous stirred reaction because of poor filterability. The elemental analyses of complexes of Examples 35–38 correspond closely to

with $a$, $b$, $c$ values, respectively, of 9/2/8; 6/3/2; 6/1/4; and 5/2/3.

Example 39

The general procedure of Example 1 was repeated using as precursor 30.0 grams of basic cupric carbonate having a total surface area of 21 square meters per gram together with 9.8 grams of bismuth subcarbonate, with the following results, referring to the letters of Example 1, the analyses being corrected for a 23.7% bismuth subcarbonate content, the corresponding $w/x/y/z$ value being 16/3/3/6.

(A) 60.6
(B) 2.5
(C) 1.3
(D) 4.6
(F) 41.2
(I) 95/1.75
(J) 1.9

Example 40

The general procedure of Example 1 was repeated except that in the activity testing, the acetylene was replaced by a mixture of acetylene and methyl acetylene containing 0.8 to 2.0 moles of acetylene per mole of methyl acetylene. The "I" value was 53. The liquid remaining after 92 percent of the formaldehyde charged had reacted had the following constitution.

| Component: | Percent of total |
|---|---|
| Methanol | 0.9 |
| Water | 68.9 |
| Formaldehyde | 2.2 |
| Propargyl alcohol | 0.4 |
| 2-butyne-1-ol | 4.5 |
| 1,4-butynediol | 24.1 |

Examples 41–44

The general procedure of Example 1 was repeated several times using basic cupric carbonate precursors containing less than 0.02 percent sulfate ion, having CuO/CO₂ mole ratios in the range of 1.86 to 2.13 and having the below-indicated values of (i) average particle size as determined by Coulter Counter analysis, (k) percent particles larger than 5 microns, and (l) total surface area, m.²/g., as determined by nitrogen absorption, with the following results referring to the letters of Example 1, and (K) percent of catalyst particles larger than 5 microns.

| Ex. No. | (i) | (k) | (l) | A | B | C | D | F | I | J | K |
|---|---|---|---|---|---|---|---|---|---|---|---|
| 41 | 8.5 | 80 | 3.9 | 59.5 | 2.6 | 1.6 | 4.1 | 16.3 | 77 | 1.0 | 95 |
| 42 | 16.5 | 96 | 18.8 | 60.0 | 2.5 | 1.6 | 3.7 | 22.2 | 78 | 1.1 | 98 |
| 43 | 5.1 | 51 | 32.9 | 59.3 | 2.5 | 2.0 | 3.4 | 44.0 | 83 | 1.3 | 93 |
| 44 | 6.2 | 68 | 66.2 | 54.5 | 2.7 | 1.2 | 2.4 | 54.9 | 93 | 1.7 | 90 |

Examples 45–50

A catalyst preparation was carried out in a gas agitated cylindrical stainless steel reactor having a working capacity of ca. 344 parts of water. The reactor was purged with nitrogen to an oxygen level of less than 0.5 percent by volume, and charged with 100 parts of aqueous 53 percent formaldehyde and 50 parts of water. The resulting solution was adjusted to pH 6.8 with calcium carbonate, and then heated to and maintained at ca. 65° C. for the duration of the catalyst preparation. The water was then purged with a commercial acetylene, containing 0.041 part of methyl acetylene per part of acetylene, introduced near the bottom of the reactor and below the liquid surface, at a rate of ca. 0.75 liter (calculated at S.T.P.) per minute per part of liquid medium, under a total pressure of 1.5 atmosphere absolute, which was thereafter maintained throughout the catalyst preparation and subsequent ethynylation. There was then added a slurry of 5 parts of the basic cupric carbonate of Example 1 in 26 parts of water, followed by like charges at intervals of 3 and 7 hours after the first copper carbonate addition. The gas stream exiting from the reactor was recovered and recycled after establishing a purge to maintain an acetylenic compound content of 90 percent on a dry basis. The catalyst make reaction was continued for an additional four hours. A sample of the resulting catalyst was removed for analysis and activity testing.

The reactor temperature was then raised to and maintained at 95° C. The rate of acetylenic feed to the reactor was doubled and the same total pressure over the liquid reaction medium maintained. When the formladehyde concentration in the liquid medium fell to 10 percent, continuous removal of liquid effluent was commenced, the effluent being withdrawn through cylindrical filter elements dipping below the liquid level in the reactor. The effluent was sent to a still and separated into a bottoms product stream consisting essentially of butynediol and water, and an overhead stream consisting essentially of unreacted formaldehyde, methanol, propargyl alcohol and water. The overhead stream was recycled to the ethynylation reaction, together with make-up 52 aqueous percent formaldehyde sufficient to maintain the formaldehyde concentration in the liquid reaction medium at ca. 10 percent, and the formaldehyde conversion across the reactor at ca. 80 percent. The reaction medium was maintained substantially neutral by periodic addition of calcium carbonate. The continuous stirred reaction was continued in this manner for 38 operating days, during which time butynediol was obtained at an average rate of ca. 4 kilograms per liter of catalyst slurry per day. Samples of the catalyst were removed at intervals for analysis. Results were as follows, referring to the letters of Example 1, the values of "A" through "D" being corrected for calcium carbonate on the basis of calcium analysis, all catalysts having "F" values greater than 15.0, being substantially free of metallic copper, and containing at least 85 weight percent of particles larger than 5 microns.

| Ex. No. | Days run | A | B | C | D | I | J | w/x/y/z |
|---|---|---|---|---|---|---|---|---|
| 45 | 0 | 59.7 | 2.6 | 1.3 | 4.4 | 73 | 1.0 | 16/4/3/6 |
| 46 | 2 | 57.4 | 2.9 | 1.4 | 4.6 | | | 14/5/4/4 |
| 47 | 4 | 55.4 | 3.1 | 1.4 | 4.3 | | | 11/4/4/4 |
| 48 | 7 | 52.2 | 3.4 | 1.3 | 3.6 | | | 16/10/6/5 |
| 49 | 9 | 51.1 | 3.6 | 1.2 | 3.9 | | | 14/8/7/5 |
| 50 | 17 | 45.4 | 4.1 | 1.2 | 2.9 | | | 5/5/3/2 |

In Example 50, when $w=4$, the $w/x/y/z$ values are 4.00/4.00/2.40/1.60.

During this period of running the catalyst activity as judged by daily production of butynediol decreased slightly to a substantially constant value after 4 days. Analysis of the effluent showed no trace of cuprene intermediates. The effluent butynediol stream was continuously removed and subjected to catalytic hydrogenation on a continuous basis with substantially complete conversion to butanediol. There was no coating of the hydrogenation catalyst with organic material or consequent loss in hydrogenation activity. Explosibility tests on the dried ethynylation catalysts showed them to be capable of detonation by heating at 162° C. for a minute or more, but substantially less sensitive than reported copper acetylides.

When a small sample was placed in a copper cup beneath a piston, dropping a 5 kg. weight from a height of 40 inches was required to cause decomposition of 50 percent of the samples tested, decomposition being evidenced by small discolorations of the striker face with what appeared to be metallic copper. No smoke was evolved and no discoloration occurred during impact testing, the bulk of the sample remaining in the cup being unaffected.

Example 51

The procedure of Example 45 was repeated, establishing a butynediol productivity of 3.8 kilograms per liter of catalyst slurry per day, at which point the continuous stirred reaction was interrupted by stopping the formaldehyde feed and liquid effluent removal, the acetylene feed and venting being continued. The temperature of the reactor contents was then decreased in controlled steps, while the formaldehyde content decreased to 2.0 percent, after which formaldehyde feed was restarted, the temperature raised, and continuous removal of liquid effluent again commenced as the formaldehyde content of the reaction mixture rose. Details are summarized below.

| Hours after HCHO stopped | Temp., °C. | HCHO, percent | Remarks |
|---|---|---|---|
| 0 | 95 | 11.5 | |
| 3.25 | 95 | 5.5 | Start cooling. |
| 4 | 80 | 5.5 | Hold temperature. |
| 7 | 80 | 3.5 | Start cooling. |
| 11 | 70 | 3.0 | Hold temperature. |
| 13 | 70 | 2.0 | Resume HCHO feed and effluent removal. |
| 16.75 | 70 | 10.5 | Start heating. |
| 17.5 | 95 | 10-13 | |

Continuing under the last-named conditions, the butynediol productivity was initially 2.0 kilograms per liter of catalyst slurry per day, and did not improve on further running. Similar decreases in re-established productivity were also observed when established continuous stirred reactions were similarly interrupted by shutting off acetylene feed for a time while maintaining HCHO feed. However, when temporary shutdown was accomplished by simultaneously and gradually changing to feeding water and nitrogen instead of formaldehyde and acetylene and cooling, and the reaction restarted by heating and then simultaneously resuming formaldehyde and acetylene feeds, no loss in productivity occurred.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A particulate cuprous acetylide complex which consists essentially of copper, carbon, hydrogen and oxygen in proportions corresponding to the general formula $$(CuC_2)_w(CH_2O)_x(C_2H_2)_y(H_2O)_z$$

wherein the subscript letters are integers and each of $w$, $x$ and $y$ is at least 1 and less than 100, contains at least 1.75 carbon atoms per copper atom, as determined by combustion analysis after filtering, water washing, air drying and final drying over anhydrous calcium sulfate for 3 days, and has a total surface area of at least 5 square meters per gram, at least 75 weight percent of the complex particles having a cross-sectional dimension of at least 5 microns, said complex being prepared by the simultaneous action of formaldehyde and acetylene on a particulate water-insoluble cupric compound.

2. The complex of claim 1 which has a total surface area of at least 15 square meters per gram.

3. The complex of claim 2 which contains at least 2 carbon atoms per copper atom.

4. The complex of claim 2 which contains at least 20 weight percent cuprous copper.

5. The complex of claim 4 which contains, per carbon atom, at least 0.2 hydrogen atom and at least 0.1 oxygen atom.

6. The complex of claim 5 which is substantially free of metallic copper.

7. The complex of claim 6 which has a total surface area of 15 to 75 square meters per gram, comprises at least 75 weight percent particles having a cross-sectional dimension of 5 to 40 mircons, and contains 20 to 66 weight percent copper, 2 to 12.5 carbon atoms per copper atom, 0.2 to 2 hydrogen atoms per carbon atom, and 0.1 to 1 oxygen atom per carbon atom.

8. The complex of claim 7 which has an average particle size of 10 to 20 microns, and contains 40 to 62 weight percent copper, 2.5 to 5 carbon atoms per copper atom, 0.5 to 1 hydrogen atom per carbon atom, and 0.15 to 0.5 oxygen atom per carbon atom.

9. The complex of claim 2 in which, when $w=4$, $x=0.24$ to $4.0$, $y=0.24$ to $2.40$ and $z=0.67$ to $2.80$.

10. The complex of claim 2 in which said cupric compound is selected from the group consisting of cupric oxide, cupric silicate, cupric phosphate, cupric hydroxide and basic cupric carbonates.

11. The complex of claim 10 in which said cupric compound is a basic cupric carbonate.

12. A process for preparing a particulate cuprous complex which comprises subjecting a particulate water-insoluble cupric compound, as a slurry in aqueous medium, at 50–120° C., to the simultaneous action of formaldehyde and acetylene at a partial pressure of not more than 2 atmospheres, said aqueous medium having a pH of 3 to 10 at the initiation of said subjecting, and continuing the reaction until a complex corresponding to claim 1 is obtained.

13. The process of claim 12 in which said aqueous medium has a pH of 5 to 8 at the initiation of said subjecting.

14. The process of claim 13 in which said cupric compound is selected from the group consisting of cupric oxide, cupric silicate, cupric phosphate, cupric hydroxide and basic cupric carbonates.

15. The process of claim 13 in which said cupric compound is a basic cupric carbonate.

16. The process of claim 15 in which said basic cupric carbonate is a synthetic malachite having a total surface area of at least 5 square meters per gram, consisting essentially of particles having a cross-sectional dimension of at least 2 microns, having a mole ratio of CuO to $CO_2$ in the range of 1.8 to 2.2, and containing less than 0.2 weight percent sulfur, calculated as sulfate ion.

17. The process of claim 14 in which the concentration of formaldehyde in said aqueous medium is at least 5 weight percent and the partial pressure of acetylene over said medium is in the range of 0.005 to 0.5 atmosphere per weight part of formaldehyde present in 100 weight parts of said aqueous medium.

18. The process of claim 17 in which the pH of said aqueous medium at the initiation of said subjecting is in the range of 6 to 7, and said temperature is in the range of 60° to 90° C.

19. The process of claim 18 in which said particulate cupric compound is a basic cupric carbonate.

20. The process of claim 18 in which said partial pressure of acetylene is in the range of 0.01 to 0.3 atmosphere per weight part of formaldehyde present in 100 weight parts of said aqueous medium.

21. The process of claim 20 in which said temperature, formaldehyde concentration and acetylene pressure are maintained until substantially all of said cupric precursor is converted to cuprous acetylide complex.

22. The process of claim 21 in which the pH of the aqueous medium during the course of said subjecting is maintained in the range of 3 to 10.

23. The process of claim 22 in which said particulate cupric compound is a synthetic malachite having a total surface area of at least 5 square meters per gram, consisting essentially of particles having a cross-sectional dimension of at least 2 microns, having a mole ratio of CuO to $CO_2$ in the range of 1.8 to 2.2, and containing less than 0.2 weight percent sulfur, calculated as sulfate ion.

References Cited

UNITED STATES PATENTS

| | | | |
|---|---|---|---|
| 2,232,867 | 2/1941 | Reppe et al. | 252—431 R |
| 2,238,471 | 4/1941 | Keyssner et al. | 260—635 Y |

PATRICK P. GARVIN, Primary Examiner

U.S. Cl. X.R.

260—438.1